June 12, 1962     M. LUEDI     3,038,211
METHOD OF MAKING FILTER CARTRIDGES
Filed Sept. 15, 1960
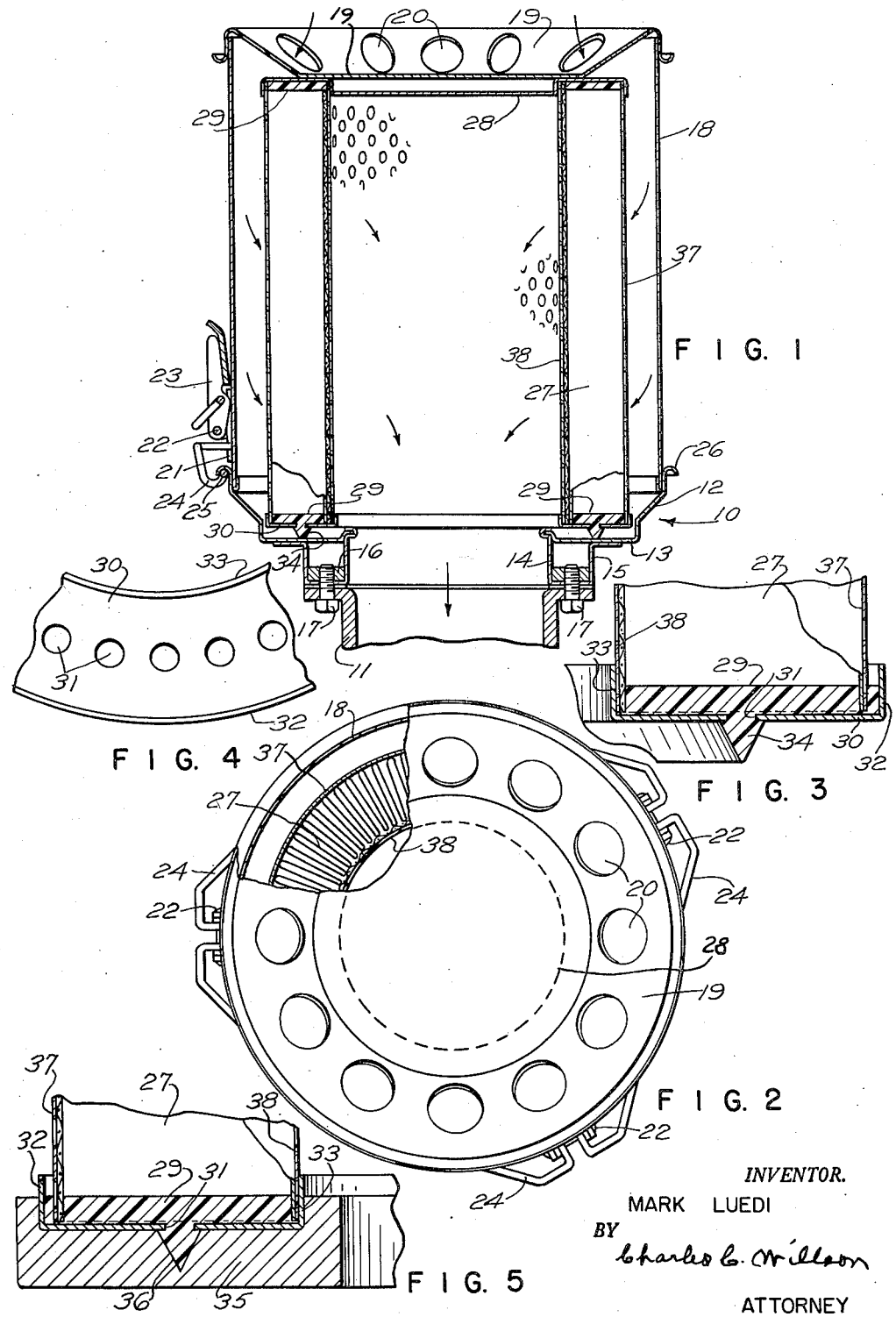
INVENTOR.
MARK LUEDI
BY Charles C. Willson
ATTORNEY

United States Patent Office 3,038,211
Patented June 12, 1962

3,038,211
METHOD OF MAKING FILTER CARTRIDGES
Mark Luedi, Dexter, Mich., assignor to Fram Corporation, Providence, R.I., a corporation of Rhode Island
Filed Sept. 15, 1960, Ser. No. 56,135
1 Claim. (Cl. 18—59)

This invention relates to filter cartridges, and more particularly to a method of bonding a metal end cap to the filter media and at the same time form some of the bonding agent into an integral gasket at the outer face of such end cap.

The present invention was developed primarily for use with air filter cartridges for filtering the air supplied to engine carburetors, but may be used upon filters for filtering air or other gases for various purposes, and for filtering liquids such as oil.

Air filters are now extensively used to filter the air supplied to the cylinders of internal combustion engines, and many of these filters employ a filter media formed of porous pleated paper. The pleats are usually arranged to form an annulus, and sealing caps are provided at each end of such annulus.

If such air filters are to be used on large heavy duty engines, the filter cartridge will need to be large, and these large cartridges are commonly provided with metal end caps. This makes it necessary to provide a sealing gasket between the outlet end of the casing in which the cartridge operates and the adjacent end of the cartridge, so that air will not bypass the filter cartridge.

Heretofore, such gasket in some cases has been bonded to the floor of the filter casing, and in this case the gasket is not changed when the filter cartridge is replaced. In other cases the gasket in the form of a rubber ring has been cemented to the outer face of such metal end cap.

The present invention relates to filter cartridges having the gasket secured to the outer face of the metal end cap so that the gasket is removed when the filter cartridge is replaced, but in accordance with the present invention such gasket is formed of the same bonding agent that bonds the metal end cap to the ends of the pleats, and comprises a molded gasket that is integrally connected to such bonding agent through holes in the end cap.

The present invention resides in a method whereby when the bonding agent is provided at the inner face of an end cap to bond the ends of the pleats to the metal cap, some of this bonding agent passes through holes in the metal cap to the outer face of such cap, and is here molded to form an integral gasket at the outer face of the metal cap.

The above and other features of the invention will be further understood when read in connection with the accompanying drawing, wherein:

FIG. 1 is a vertical sectional view through a metal shell or container for an air filter having a filter cartridge mounted therein.

FIG. 2 is a top plan view of FIG. 1 with parts broken away to show the pleated filter cartridge.

FIG. 3 on a larger scale is a vertical sectional view through a lower end portion of the filter cartridge shown in FIG. 1.

FIG. 4 is a plan view of a portion of the lower metal end cap having holes formed through the metal; and FIG. 5 is a vertical sectional view through a portion of a mold for receiving the lower end cap of the filter cartridge, and shows how the molded gasket is formed.

In order to make the present invention clear, there is shown in the drawing a pleated type of air filter cartridge mounted in a metal housing, but it will be understood that the housing forms no part of the present invention and may be varied extensively, also, that the construction of the filter cartridge may be varied extensively.

Referring to FIG. 1 of the drawing, the numeral 10 designates a dish-shaped base which is adapted to be mounted on a tubular supporting member 11 which may lead to the carburetor of an engine. The base 10 has an upstanding annular outer wall 12 and a horizontal portion 13, and to the lower face of the horizontal wall 13 is secured a trough-shaped annular member comprising the inner wall 14 and coincided outer wall 15. The upper end of the annular wall 15 is spot welded or otherwise secured to the horizontal wall 13. Within the annular member 14—15 is secured a metal ring 16 which is drilled and threaded as shown to receive bolts 17 that secure the filter housing to the tubular supporting member 11. The filter housing has an annular outer wall 18, the outer diameter of which is such that its lower end will fit snugly inside the annular wall 12 of the base 10. The upper end of the annular wall 18 is provided with the annular lid or cover 19 which is welded or otherwise secured to the upper end of the wall 18, and this cover has a sloping annular portion provided with the air inlet holes 20.

The arrangement just described is such that the entire upper portion of the housing comprising the annular wall 18 and cover 19 may be removed from the base member 10 when it is desired to secure access to the filter cartridge housed therein. This removable portion 18—19 of the housing is retained in the position in which it is shown by suitable clamps. Three such clamps are shown; each comprises a supporting bracket 21 welded or otherwise secured to the outer surface of the wall 18, and pivotally secured to each bracket by a pin 22 is the swinging lever 23. To this lever is secured the clamping member comprising the downwardly extending spring legs 24 having the horizontal extending connecting bar 25 which engages an annular flange 26 of the upstanding wall 12.

Within the air filter shell or housing just described is mounted an air filter cartridge, the filter element of which comprises the annular member 27 formed of pleated paper. The upper end of this annular filter element 27 is closed by a metal end disc or end cap 28 provided with the annular recessed portion shown. This end cap is firmly secured to the upper end of the pleated element 27 by a bonding agent 29, such as plastisol.

To the lower end of the pleated element 27 is secured, by plastisol or the like 29, the ring-shaped end cap 30. This end cap differs from the end cap 28 in that the end cap 30 has a central hole through which the filtered air can pass downwardly as indicated by the arrows to and through the annular supporting member 11.

The construction so far described forms no essential portion of the present invention, but serves to make clear the subject matter of the present invention which will now be described. The end cap 30 has provided in a complete circle the holes 31 which may be in the form of short slots or the circular holes shown. The arrangement is such that when the bonding agent, such as the plastisol 29 is placed in the lower end cap 30, having the upstanding outer wall 32 and inner wall 33, some of this plastisol will flow through the holes 31 to form a gasket 34 at the outer face of this cap. Such gasket may be given any desired shape in cross section. It is shown as V-shaped in cross section, but it may be molded so that it is square or round in section. The desired shape is imparted to this gasket by placing the parts shown in FIG. 3 in a ring-shaped mold 35. Such mold is shown in FIG. 5 as a section taken through one annular wall of such ring-shaped mold. The mold 35 is shaped to receive the end portion 30 of the annular filter cartridge shown in FIG. 3. This mold has an annular recess 36, the shape of which defines the cross sectional shape of the integral gasket 34.

In making the filter cartridge herein contemplated, the plastisol 29 is placed in the end cap 30 in sufficient quantity to build up a thickness of appreciable height so that this plastisol will form an air tight seal with the lower end of the pleats 27 embedded in this plastic. This plastisol may also have imbedded therein the lower end of an outer metal protecting screen 37 that surrounds the pleated element, and the lower end of an annular inner protecting screen 38 at the inner wall of such pleated element. After the plastisol 29 has been placed in the end cap 30 and the parts 27, 37 and 38 have been imbedded therein, the plastisol is heated to cure the same. This can be done by heating the mold 35, and as the plastisol is warmed up, some of it will flow through the holes 31 to fill the annular groove 36 and form a gasket 34 at the outer face of the end cap 30, which is integrally connected to the mass of plastisol 29 as shown in FIGS. 3 and 5.

It will be seen from the foregoing that the method of the present invention provides a simple means for providing the metal end cap of a filter cartridge with an integral molded gasket secured to the outer face of the end cap where it serves to provide an air tight seal between the lower end of the air cartridge and the floor of the annular base member 10 of the filter housing. As a result of this construction, the gasket is permanently secured in its proper position at the outer face of the end cap 30 and is removed when the cartridge is changed, so that each time a cartridge is replaced it will have a new sealing gasket.

In operation the air to be filtered enters through the holes 20 in the cover to pass downwardly in the shell 18 around the filter element 27 and inwardly through this pleated paper 27 of the filter cartridge. The clean air then passes downwardly as indicated by the arrows in FIG. 1 through the tubular support 11 to the engine.

Having thus described my invention, what I claim and desire to protect by Letters Patent is:

In the manufacture of a replaceable air filter cartridge for use in a filter housing; the steps of providing a cylindrical air filter cartridge having a filter element formed of pleated fibrous material, providing an annular metal end cap at the lower end of the pleats to cover completely these ends and which cap has upstanding inner and outer circular walls adapted to retain a fluid plastic in the cap, providing such cap with holes in its bottom through which a plastic can pass, then depositing an elastic plastic while in a fluid condition in said cap to bond it to said pleats and cause some of the plastic to flow through said holes to the lower face of the cap, and molding the plastic that passes through said holes into an annular sealing gasket that is integrally and permanently connected through said holes to the plastic at the upper face of said cap to anchor the gasket in place.

References Cited in the file of this patent

UNITED STATES PATENTS

| | | |
|---|---|---|
| 2,122,111 | Poelman et al. | June 28, 1938 |
| 2,456,615 | Berglund | Dec. 21, 1948 |
| 2,732,031 | Rabbitt et al. | Jan. 24, 1956 |
| 2,771,156 | Kasten et al. | Nov. 20, 1956 |
| 2,895,174 | Hockett | July 21, 1959 |
| 2,965,933 | Kasten | Dec. 27, 1960 |